(12) United States Patent
Baker et al.

(10) Patent No.: US 7,677,281 B2
(45) Date of Patent: Mar. 16, 2010

(54) POWER ROUTER TOOL

(75) Inventors: Timothy Baker, Aurora, IL (US);
Michael Beruscha, Algonquin, IL (US);
David Clarke, Chicago, IL (US);
Robert Glenn, Chicago, IL (US); Kevin Wasielewski, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 12/005,330

(22) Filed: Dec. 26, 2007

(65) Prior Publication Data
US 2009/0165892 A1    Jul. 2, 2009

(51) Int. Cl.
*B27C 5/10*    (2006.01)
*B23C 1/12*    (2006.01)

(52) U.S. Cl. .................. 144/136.95; 409/182; 409/206

(58) Field of Classification Search ............ 144/136.95, 144/154.5; 409/182, 206, 210, 218, 180–181
See application file for complete search history.

(56) References Cited

U.S. PATENT DOCUMENTS

| | | | |
|---|---|---|---|
| 5,813,805 A | 9/1998 | Kopras | |
| 5,829,931 A | 11/1998 | Doumani | |
| 6,443,675 B1 * | 9/2002 | Kopras et al. | 409/182 |
| 6,443,676 B1 * | 9/2002 | Kopras | 409/182 |
| 6,447,221 B1 | 9/2002 | Chen | |
| 6,820,339 B2 | 11/2004 | Albrightson | |
| 6,835,030 B2 * | 12/2004 | Pozgay et al. | 408/182 |
| 6,854,938 B2 * | 2/2005 | Kopras et al. | 409/182 |
| 6,890,135 B2 * | 5/2005 | Kopras et al. | 409/182 |
| 7,094,011 B2 * | 8/2006 | Kopras et al. | 409/137 |
| D529,354 S | 10/2006 | Davis et al. | |

* cited by examiner

*Primary Examiner*—Shelley Self
(74) *Attorney, Agent, or Firm*—Greer, Burns & Crain, Ltd.

(57) ABSTRACT

Embodiments of the present invention are directed to a power router tool having an output shaft with a mechanism for attaching a working tool for engaging a work portion for performing a work operation thereon, comprising a generally cylindrical housing having a motor therein configured to drive the output shaft during operation, the housing having a nose portion from which the output shaft extends and a rear end portion opposite the nose portion, at least one switch in the housing operatively connected to the motor for controlling the operation thereof, an adjustable and removable depth guide mounted to the nose portion of the housing, the depth guide having an axial portion that is generally parallel to the output shaft and an end portion that is generally perpendicular to the output shaft, the axial and end portions having a construction that provided minimal visual obstruction during use.

11 Claims, 3 Drawing Sheets

POWER ROUTER TOOL

BACKGROUND OF THE INVENTION

The present invention generally relates to handheld power tools.

Relatively small handheld power tools that have a rotating output shaft include those that are known as spiral cutting tools and are used by tradesmen, particularly in the construction trades. Such spiral cutting tools utilizes a spiral bit that has a sharp cutting edge that is configured in a spiral around an axis of the bit and is designed to cut materials perpendicular to the axis of a bit. They are often used by contractors to cut holes in drywall for electrical outlets, switches as well as other components such as duct work, vents and the like. The spiral cutting tools operate much like a router and are often referred to in the trades as handheld router tools. The tools are conveniently sized to be held in one hand by a user and are relatively high powered for their size and operate at high rotating speeds. Because they are relatively lightweight, they are powered by a cord rather than by a relatively heavy power pack design.

Because they are often used to cut drywall, they are commonly equipped with a depth guide so that the cutting bit does not penetrate much beyond the opposite side of the material which they are cutting. Because cuts are often made at corners or other inconvenient locations, it is desirable to have the depth guide be relatively small in size so that it does not appreciably decrease the ability of the operator to see exactly where he is cutting. It is also desirable that it not interfere appreciably with a collet that the operator may need to manipulate to remove and replace spent tool bits.

Operators often use a pencil to draw an outline of the cut that is to be made, but even if that is not done, operators often use the tool in a free hand manner to cut a precise rectangle or other shape to expose an electrical outlet or switch and such free hand operation requires the operator to be able to see what is being cut.

Improvements in the design of such tools continues to be the subject of research and engineering efforts.

SUMMARY OF THE INVENTION

Embodiments of the present invention are directed to a power router tool having an output shaft with a mechanism for attaching a working tool for engaging a work portion for performing a work operation thereon, comprising a generally cylindrical housing having a motor therein configured to drive the output shaft during operation, the housing having a nose portion from which the output shaft extends and a rear end portion opposite the nose portion, at least one switch in the housing operatively connected to the motor for controlling the operation thereof, an adjustable and removable depth guide mounted to the nose portion of the housing, the depth guide having an axial portion that is generally parallel to the output shaft and an end portion that is generally perpendicular to the output shaft, the axial and end portions having a construction that provided minimal visual obstruction during use.

DETAILED DESCRIPTION OF THE PREFERRED EMBODIMENT

Figure 1:
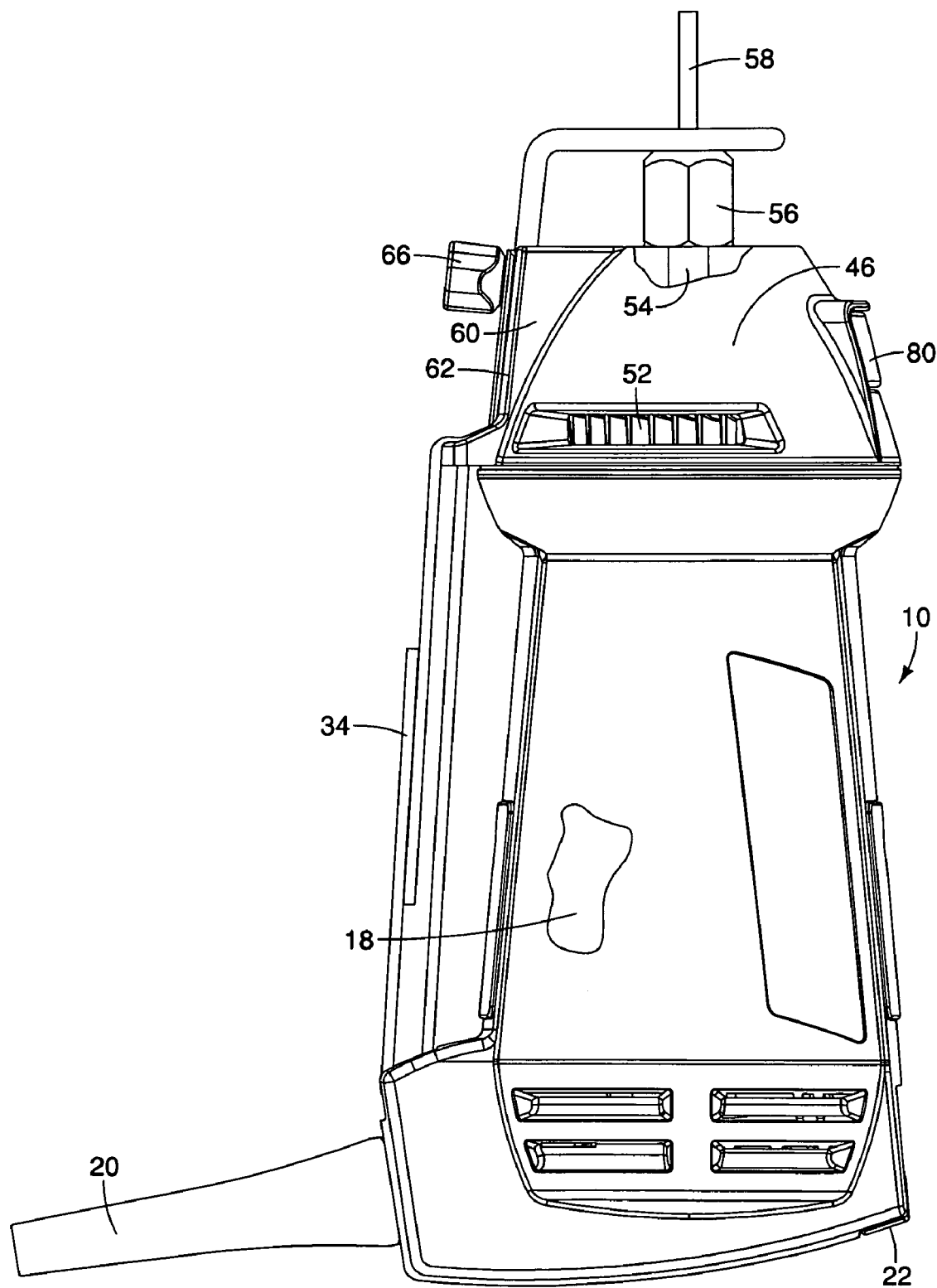
FIG. 1 is a left side view of the preferred embodiment of the present invention.

The preferred embodiment of the power router tool of the present invention is shown in the drawings and is broadly similar to currently marketed electrically powered rotary tools that often employ spiral cutting tools for cutting openings in drywall and other wall materials. Such tools are commonly used by tradesmen in the building trades for cutting openings in drywall for exposing electrical switches, outlets, heating and air conditioning vents, as well as a myriad of other cutting operations.

Such router tools are typically small handheld units that can be operated with only one hand and are frequently used in a freehand manner to penetrate drywall and then cut an opening in it. Such router tools often have a shaft lock button near the nose portion of the unit that is capable of locking the output shaft so that a wrench can be used on a collet or other mechanism to install or change out cutting tools that may be excessively worn or broken. The output shaft is typically directly driven by a small but powerful high speed electrical motor.

Because it is desirable to have a relatively lightweight unit, such rotor tools are typically powered by cords that are plugged into an AC power source. Because the tools are used in the building trades, they are required to endure severe loads under harsh conditions. The brushes on the motors are often required to be replaced and the construction of the units must be compatible with heavy duty operation, as well as physical abuse such as being frequently dropped and the like during use. Also, because they have high speed operation, operators often impatiently wait for the output shaft to stop spinning and may use the pushbutton shaft lock mechanism as a brake.

Figure 2:
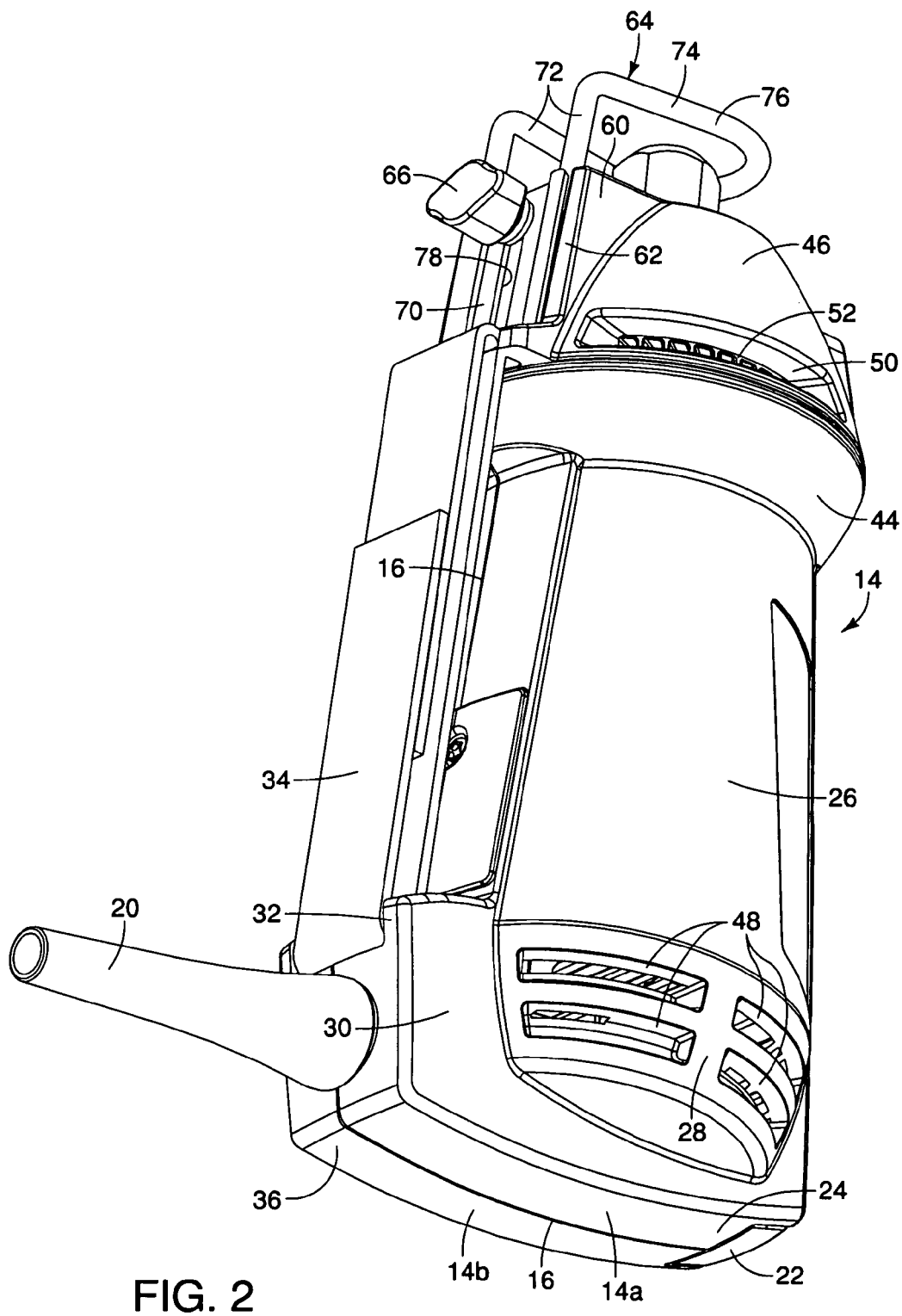
FIG. 2 is another left side perspective view of the preferred embodiment.
Figure 3:
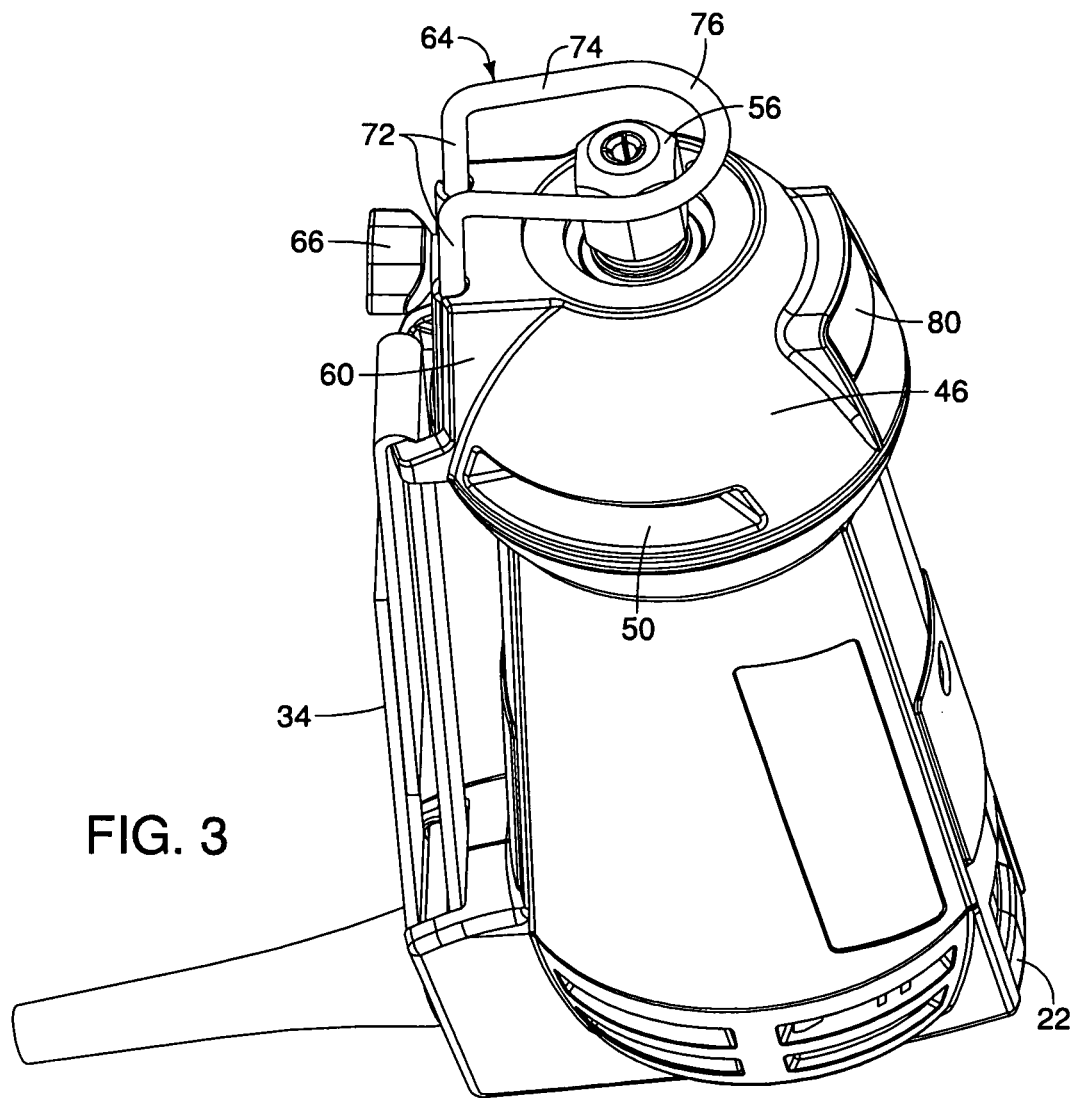
FIG. 3 is an upper left side perspective view of the preferred embodiment.

Turning now to the drawings and particularly FIGS. 1-3, the preferred embodiment of the router tool, indicated generally at 10, includes a housing indicated generally at 14 which is preferably a clam shell design made of mating sections 14a and 14b that mate generally along line 16 that extends the entire length of the unit. The joint line 16 is located generally midway so that the two sections 14a and 14b are symmetrical, it should be understood that other lines of separation may be used as is known to those in the tool manufacturing art.

The tool 10 has an internal motor 18 that is preferably powered by an AC source via a cord 20 only a small length of which is illustrated in the drawings. The motor is controlled by a switch 22 which is preferably a slide switch that is shown in FIGS. 1, 2 and 7 in an off position. When it is in an on position, the end surface as shown in FIG. 2 would extend beyond a rear end surface 24 of the tool. This extension beyond the rear end surface 24 enables an operator to easily turn off the motor by bumping the end of the switch 22 against a work or other surface or his body. This makes turning off the router tool 10 intuitive as is desired.

The housing 14 has a generally cylindrical center portion 26, a slightly tapered or conical rear end portion 28 that is shaped to provide the user with a comfortable grip on the tool. The tapered end portion has an outward extension 30 on the left side thereof which serves multiple purposes, including providing egress for the cord 20, a forward directed end 32 that has a pin (not shown) for securing one end of a leather or cloth strap 34 that the operator may use to facilitate holding of the tool 10 during use. The housing 14 has an outwardly flared portion 44 toward the front of the center portion 26 for providing added resistance for an operator's hand, when the operator presses the tool toward the work piece. The outwardly flared portion then merges with a tapered nose portion 46 that is provided to facilitate increased line of sight to an operator during use.

Vents 48 in the rear end of the housing 14 provide an inlet for air passing through the housing and an outlet vent 50 is also provided, it being understood that air passes through the interior of the housing and thereby cools the motor. The motor has its output shaft provided with a fan for promoting air flow through the housing, the blades 52 of which are visible in FIGS. 1 and 2. The fan is preferably attached to the output shaft 54 which is shown when the housing 14 is broken away in FIG. 1. A collet 56 is preferably provided for attaching a working tool, such as a spiral cutting bit 58 shown in FIG. 1. The collet 56 is preferably hexagonal so that it can be tightened or loosened with a wrench.

The tapered nose portion 46 is interrupted by a nontapered portion 60 that has an outer surface 62 that is nearly parallel to the axis of the output shaft 54 and is configured to retain an adjustable and removable depth guide, indicated generally at 64. The depth guide 64 is retained by a thumb screw, indicated generally at 66, which has a threaded portion that engages a threaded opening (not shown) in the surface 62. The thumb screw 66 can be loosened so that the depth guide 64 can be adjusted to control the depth of penetration of the spiral cutting tool 58, for example.

Figure 4:
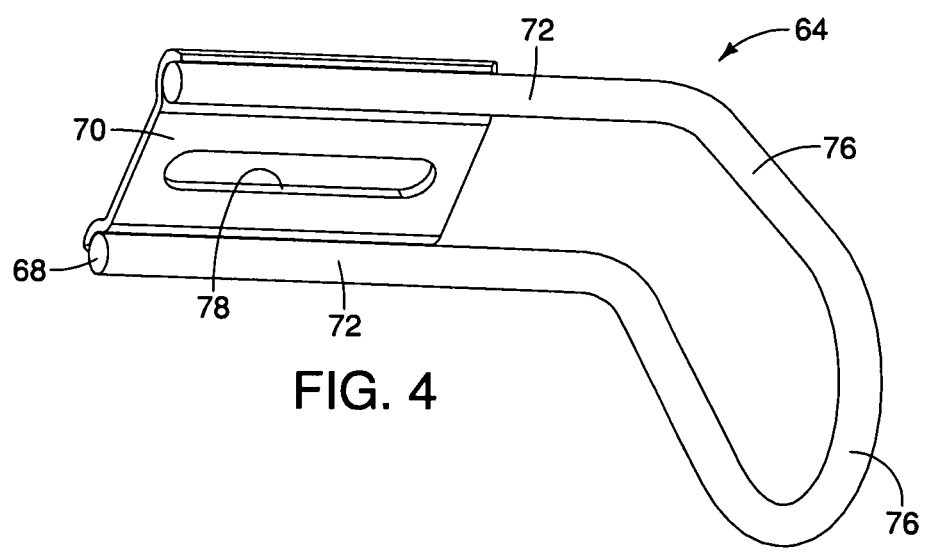
FIG. 4 is a perspective view of a portion of the depth guide of the preferred embodiment.

The depth guide 64 is shown alone in FIG. 4 and comprises a stiff wire 68 that is preferably spot welded or otherwise connected to a generally flat bridge plate 70. The wire 68 has a pair of axially oriented portions 72 that are spaced apart and bonded to the bridge plate 70, with the axial portions merging into a transverse end 74 that has a semi-circular portion 76 that is concentric with the shaft 54, the inner diameter of the portion 76 being slightly larger than the outside dimension of the collet 56. The bridge plate 70 also contains an elongated slot 78 through which the thumb screw 66 passes and enables the depth guide 64 to be adjusted in the axial direction relative to the nose portion 46. The nose portion 46 also has a depressible shaft lock button 80, which when pushed inwardly results in the output shaft 54 being locked so that the wrench can be used to tighten or loosen the collet 56.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power router tool having an output shaft with a mechanism for attaching a working tool for engaging a work portion for performing a work operation thereon, said router tool comprising:
    a generally cylindrical housing having a motor therein configured to drive the output shaft during operation, said housing having a nose portion with an outer end surface from which the output shaft extends and a rear end portion opposite said nose portion;
    at least one switch in said housing operatively connected to said motor for controlling the operation thereof;
    an adjustable and removable depth guide mounted to said nose portion of said housing, said depth guide having an axial portion that is generally parallel to the output shaft and an end portion that is generally perpendicular to the output shaft, said axial and end portions being integrally formed from a stiff wire having a generally circular cross section that provides minimal visual obstruction during use.

2. A power router tool as defined in claim 1 wherein said nose portion is tapered inwardly toward the output shaft progressively toward said outer end surface thereof to improve visibility of an attached working tool by a user during engagement of a work portion.

3. A power router tool as defined in claim 2 wherein said nose portion has a non-tapered portion that is configured to have said axial portion of said depth guide attached thereto.

4. A power router tool as defined in claim 1 wherein said axial portion merges with said end portion and said end portion has a generally semicircular portion that is generally concentric with the output shaft.

5. A power router tool as defined in claim 4 wherein the inside diameter of said semicircular portion is slightly larger than the outer diameter of the attaching mechanism.

6. A power router tool as defined in claim 1 wherein said axial portion comprises two spaced portions of said stiff wire and a bridge plate attached to said spaced portions, said bridge plate having an elongated slot for receiving a threaded bolt for securing said depth guide to said housing, the position of said bolt along said slot determined the depth setting of said depth guide.

7. A power router tool as defined in claim 6 wherein said threaded bolt is a thumbscrew configured to be threaded into a corresponding threaded aperture in said housing.

8. A power router tool as defined in claim 1 wherein the attaching mechanism is a collet having an outer configuration with at least two opposing flat surfaces.

9. A power router tool having an output shaft with a collet for attaching a working tool for engaging a work portion for performing a work operation thereon, said router tool comprising:
    a generally cylindrical housing having a motor therein configured to drive the output shaft during operation, said housing having a tapered nose portion from which the output shaft extends and a rear end portion opposite said nose portion;
    at least one switch in said housing operatively connected to said motor for controlling the operation thereof;

an adjustable and removable depth guide mounted to said nose portion of said housing, said depth guide having an axial portion that is generally parallel to the output shaft and an end portion that is generally perpendicular to the output shaft, said axial and end portions being integrally formed from a stiff wire having a generally circular cross section that provides minimal visual obstruction during use.

10. A power router tool having an output shaft with a collet for attaching a working tool for engaging a work portion for performing a work operation thereon, said router tool comprising:

a generally cylindrical housing having a motor therein configured to drive the output shaft during operation, said housing having a nose portion from which the output shaft extends, a major portion of circumference of said nose portion being tapered toward the outer end thereof, said housing having a rear end portion opposite said nose portion;

at least one switch in said rear end portion of said housing operatively connected to said motor for controlling the operation thereof an adjustable and removable depth guide mounted to an untapered portion of said nose portion of said housing, said depth guide being configured to have a mounting portion for attachment to said untapered portion of said nose portion and an axial portion that is generally parallel to the output shaft connected to said mounting portion, said axial portion merging into a transverse end portion, said axial and transverse end portions being integrally formed from a stiff wire having a generally circular cross section that provides minimal visual obstruction during use.

11. A power router tool as defined in claim 10 wherein said end portion has a generally semicircular portion that is generally concentric with the output shaft.

* * * * *